(12) United States Patent
Sweeney et al.

(10) Patent No.: US 8,144,858 B2
(45) Date of Patent: *Mar. 27, 2012

(54) UNRECOGNIZED NUMBER IDENTIFIER

(75) Inventors: Tana Marie Sweeney, San Ramon, CA (US); Nancy Ann Book, Naperville, IL (US); Carol Shifrin Gruchala, Naperville, IL (US); Dianna Inara Tiliks, Palatine, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1131 days.

This patent is subject to a terminal disclaimer.

(21) Appl. No.: 11/385,903

(22) Filed: Mar. 22, 2006

(65) Prior Publication Data

US 2006/0182254 A1    Aug. 17, 2006

Related U.S. Application Data

(63) Continuation of application No. 10/200,977, filed on Jul. 24, 2002, now Pat. No. 7,046,785.

(51) Int. Cl.
*H04M 3/42* (2006.01)
(52) U.S. Cl. .......... 379/218.01; 379/207.02; 379/207.11
(58) Field of Classification Search ............... 379/88.18, 379/93.01, 201.01, 207.02, 207.11, 218.01, 379/221.08, 93.17, 211.08, 211.09
See application file for complete search history.

(56) References Cited

U.S. PATENT DOCUMENTS

| | | | |
|---|---|---|---|
| 4,608,460 A | 8/1986 | Carter et al. | |
| 4,734,931 A | 3/1988 | Bourg et al. | |
| 5,119,415 A | 6/1992 | Aoyama | |
| 5,450,476 A | 9/1995 | D'Apuzzo et al. | |
| 5,521,969 A | 5/1996 | Paulus et al. | |
| 5,608,788 A | 3/1997 | Demlow et al. | |
| 5,819,180 A | 10/1998 | Alperovich et al. | |
| 5,835,583 A | 11/1998 | Hetz et al. | |
| 5,926,754 A | 7/1999 | Cirelli et al. | |
| 5,943,409 A | 8/1999 | Malik | |
| 6,058,179 A * | 5/2000 | Shaffer et al. | 379/220.01 |
| 6,252,953 B1 | 6/2001 | Gruchala et al. | |
| 6,289,090 B1 | 9/2001 | Tessler et al. | |
| 6,324,273 B1 | 11/2001 | Alcott | |
| 6,400,809 B1 | 6/2002 | Bossemeyer et al. | |
| 6,404,877 B1 | 6/2002 | Bolduc et al. | |
| 6,421,672 B1 | 7/2002 | McAllister et al. | |
| 6,570,974 B1 | 5/2003 | Gerszberg et al. | |

(Continued)

FOREIGN PATENT DOCUMENTS

JP    1-143550    6/1989

(Continued)

OTHER PUBLICATIONS

WhitePages—InfoSpace (Reverse phone directory searches).*

(Continued)

*Primary Examiner* — Antim Shah
(74) *Attorney, Agent, or Firm* — Greenblum & Bernstein, P.L.C.

(57) ABSTRACT

Communication address identification information is obtained. A communication address number is collected from a customer at a telecommunications apparatus in response to a trigger being initiated at a switch and a connection being established between the switch and the telecommunications apparatus. Communication address identification information is obtained from a memory in response to collecting the communication address number from the customer. The communication address identification information is returned to the customer when communication address identification information corresponding to the communication address number is available at the memory.

24 Claims, 7 Drawing Sheets

U.S. PATENT DOCUMENTS

| | | | |
|---|---|---|---|
| 6,580,790 B1 | 6/2003 | Henry et al. | |
| 6,628,772 B1 | 9/2003 | McGrath et al. | |
| 6,697,461 B1 | 2/2004 | Middleswarth et al. | |
| 6,721,401 B2 | 4/2004 | Lee et al. | |
| 6,795,543 B1 * | 9/2004 | Cartier et al. | 379/219 |
| 6,829,332 B2 | 12/2004 | Farris et al. | |
| 2003/0179857 A1 | 9/2003 | Conn et al. | |
| 2004/0174978 A1 * | 9/2004 | Bedingfield et al. | 379/221.02 |

FOREIGN PATENT DOCUMENTS

| | | |
|---|---|---|
| JP | 1-204558 | 8/1989 |

OTHER PUBLICATIONS

PhoneNumberScan (Reverse phone and cell phone mobile search).*

Reverse telephone directory—Wikipedia, the free encyclopedia.*

English language Abstract of JP 1-143550, Publication date: Jun. 6, 1989.

English language Abstract of JP 1-204558, Publication date: Aug. 17, 1989.

A screen-shot of a Chicago Tribune Online Edition article downloaded Jun. 3, 2002, entitle "Car-phone Calls Put Thief in Cell".

* cited by examiner

UNRECOGNIZED NUMBER IDENTIFIER

This application is a continuation application of U.S. patent application Ser. No. 10/200,977, filed on Jul. 24, 2002, which issued as U.S. Pat. No. 7,046,785 on May 16, 2006, the disclosure of which is expressly incorporated herein by reference in its entirety.

BACKGROUND OF THE INVENTION

1. Field of the Invention

The present invention relates to an information service in a telecommunications environment. More particularly, the present invention relates to a telecommunications system and method for a calling party to obtain information when the calling party dials a service number and provides an unrecognized number corresponding to the information sought by the calling party.

2. Background Information

A need exists to ascertain information associated with an unrecognized number. For example, when a customer of a telecommunications service provider receives a phone bill, the customer may see an unrecognized number. The customer may wish to ascertain information associated with the unrecognized number, such as the name and address of the subscriber corresponding to the unrecognized number, without first calling the number directly.

Additionally, a customer of a telecommunications service provider may receive a phone call and need to ascertain information associated with an unrecognized number, such as when an emergency call center receives a call from a wireless subscriber number, the call is hung-up or dropped, and the emergency call center is not able to successfully call back the wireless subscriber to obtain additional information.

Currently, the customer of a telecommunications service provider may obtain the information associated with a listed unrecognized number by calling a telecommunications service provider's business office and making an inquiry through a business agent. However, manually answering inquiries to determine the associated information is an inefficient use of telecommunications service provider manpower. In addition, customers requesting information may waste time waiting for a customer service representative at the business office to answer the phone, determine whether the information exists, and provide the information if it exists.

In some areas, an automated service may be provided for customers to obtain information associated with a listed unrecognized number. For example, a customer in Chicago, Ill. may dial 796-9600 in order to connect with an interactive service that associates an unrecognized number with information of a corresponding subscriber. However, because the 796-9600 number corresponds to a terminating number, the process of activating any service logic, including performing a database inquiry, may only be possible after a connection is made to 796-9600. In other words, 796-9600 does not take advantage of features of an Advanced Intelligent Network (AIN) that uses dispersed network resources to handle the call. Accordingly, the 796-9600 service may be limited by equipment constraints or prohibitive equipment requirements.

Additionally, a person may use the World Wide Web by, for example, visiting whitepages.com or reversephonedirectory.com and entering an unrecognized number to determine if the unrecognized number is listed and obtain information corresponding to the number if the number is listed. Information for unlisted numbers may not be accessible whatsoever on the World Wide Web due to privacy concerns or legal restrictions, even if the person making the inquiry is legally authorized to obtain such information.

Accordingly, customers may be willing to incur a monthly charge or a charge each time they call an unrecognized number identifier service to determine information associated with a listed number. An automated method and system for obtaining the associated information may turn an unprofitable service into a profitable service for a telecommunications service provider. Moreover, using a shortened dialing pattern will likely lead to increased usage as customers can more readily remember the number associated with the service.

A telecommunications system and method are needed for automatically obtaining information associated with a listed number so that the information associated with the listed number may be easily provided to a telecommunications service provider customer when a shortened dialing pattern is entered and the unrecognized number is provided. In addition, a telecommunications system and method are needed for automatically obtaining information associated with an unlisted number so that the information associated with the unlisted number may be provided to an authorized party, such as a public safety official or an authorized legal authority.

To solve the above-described problems, a telecommunications system and method are provided for providing an unrecognized number identification service in a telecommunications environment.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawing, and in which.

DETAILED DESCRIPTION OF THE INVENTION

Figure 1:
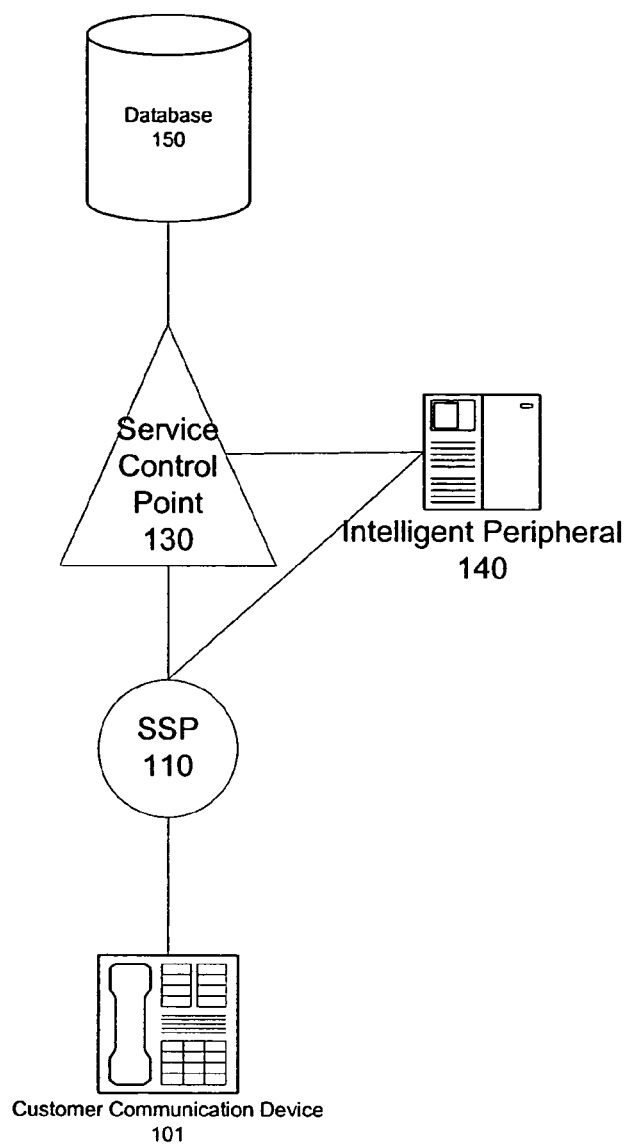
FIG. 1 shows an exemplary telecommunications network architecture for the unrecognized number identifier service, according to an aspect of the present invention.

In view of the foregoing, the present invention, through one or more of its various aspects, embodiments and/or specific features or sub-components, is thus intended to bring out one or more of the advantages as specifically noted below.

In one aspect of the invention, a telecommunications method is provided that obtains subscriber identification information in a telecommunications environment using a subscriber number input by a customer calling a subscriber identification information service. A trigger is initiated at a switch based upon receiving a shortened telephone number provided by the customer. In response to the trigger, the subscriber number is collected from the customer. A query using the subscriber number is forwarded to the memory apparatus in response to receiving the subscriber number from the customer. The subscriber identification information is forwarded to the customer when the subscriber identification information corresponding to the subscriber number is available at the memory apparatus for the customer. A message is forwarded to the customer indicating that the subscriber number is unlisted when subscriber identification information corresponding to the subscriber number is unlisted.

In another aspect of the present invention, the subscriber identification information is received from the memory apparatus as a data signal at an intelligent peripheral and translated into an audible signal.

In a further aspect of the present invention, an audible instruction to provide the subscriber number information is forwarded from an intelligent peripheral to the customer.

In still another aspect of the present invention, a query is received at a service control point based on the trigger initiated at the switch. In response to the query, the service control point may instruct the intelligent peripheral to forward the audible instruction to the customer to provide the subscriber number.

In still another aspect of the present invention, a determination is made whether the customer is authorized to receive subscriber identification information corresponding to an unlisted subscriber number.

In yet another aspect of the present invention, the determination includes receiving a line indicator that indicates a type of line used by the customer.

In another aspect of the present invention, connecting the customer to an intelligent peripheral includes initiating a call connection from the switch to the intelligent peripheral.

In a further aspect of the present invention an option message is forwarded to the customer. The option message includes options to provide a new subscriber number, to terminate the call, and to provide authorization information.

In still another aspect of the present invention, the query to the memory apparatus is forwarded from an intelligent peripheral via a service control point. The service control point receives a response from the memory apparatus and determines whether subscriber identification information is available.

In another aspect of the present invention, a telecommunications system is provided that obtains subscriber identification information using a subscriber number input by a customer calling a subscriber identification information service. The system includes a switch that initiates a trigger based upon receiving a shortened telephone number provided by the customer. The switch forwards a first query to a service control point to obtain routing instructions and the switch routes the call based on the routing instructions received from the service control point. The system also includes an intelligent peripheral that receives the call from the switch. The intelligent peripheral forwards a second query using the subscriber number to the memory apparatus in response to receiving the subscriber number from the customer. The intelligent peripheral forwards subscriber identification information corresponding to the subscriber number to the customer when the subscriber identification information is available at the memory apparatus for the customer. When the subscriber identification information is unlisted, the intelligent peripheral forwards a message to the customer indicating that the subscriber identification information is unlisted.

In still another aspect of the present invention, the intelligent peripheral includes a text-to-speech processor that receives the subscriber identification information from the memory apparatus as a data signal and translates the subscriber identification information into an audible signal.

In yet another aspect of the present invention, the system includes a security apparatus that determines whether the customer is authorized to receive subscriber identification information corresponding to an unlisted subscriber number.

In another aspect of the present invention a call connection is initiated from the switch to the intelligent peripheral.

In a further aspect of the present invention, the second query to the memory apparatus is forwarded from the intelligent peripheral via the service control point. The service control point receives a response from the memory apparatus and determines whether subscriber identification information is available.

In another aspect of the present invention, a telecommunications system is provided that obtains subscriber identification information using a subscriber number input by a customer calling a subscriber identification information service. The system includes a switch that forwards a first query to obtain routing instructions for the call based upon receiving a shortened telephone number provided by the customer. The system also includes a service control point that receives the query from the switch, causing the service control point to obtain a routing instruction for the call. The service control point forwards the routing instruction for the call to the switch. The system further includes an intelligent peripheral that receives the call from the switch based upon the routing instruction from the service control point. The intelligent peripheral forwards a second query using the subscriber number to the memory apparatus in response to receiving the subscriber number from the customer. The intelligent peripheral forwards subscriber identification information corresponding to the subscriber number to the customer when the subscriber identification information is available at the memory apparatus for the customer. When the subscriber identification information is unlisted, the intelligent peripheral forwards a message to the customer indicating that the subscriber identification information is unlisted.

In yet another aspect of the present invention, the intelligent peripheral includes a text-to-speech processor that receives the subscriber identification information from the memory apparatus as a data signal and translates the subscriber identification information into an audible signal.

In still another aspect of the present invention, the system includes a security apparatus that determines whether the customer is authorized to receive subscriber identification information corresponding to an unlisted subscriber number.

In a further aspect of the present invention, the service control point instructs the intelligent peripheral to forward an audible instruction to the customer to provide the subscriber number.

In another aspect of the present invention, a computer readable medium is provided for storing a computer program that obtains subscriber identification using a subscriber number input by a customer calling a subscriber identification information service. The computer readable medium includes a signal receiving source code segment that receives a signal from a switch that is sent in response to the switch receiving a shortened telephone number provided by the customer. The signal receiving source code segment determines a routing instruction for the call and forwards the routing instruction to the switch to connect the customer to an intelligent peripheral. The computer readable medium also includes an information requesting source code segment that causes a request for subscriber information to be forwarded to a memory apparatus when the intelligent peripheral receives the subscriber number from the customer. The computer readable medium further includes an information transmission source code segment that causes the intelligent peripheral to forward subscriber information to the customer when subscriber identification information corresponding to the subscriber number is available at the memory apparatus. When the subscriber identification information is unlisted, the information transmission source code segment causes the intelligent peripheral to forward a message indicating that the subscriber number is unlisted.

In another aspect of the present invention, the computer readable medium includes an authorization determination source code segment that determines whether the customer is authorized to receive subscriber identification information corresponding to an unlisted subscriber number.

In still another aspect of the present invention, the computer readable medium includes an instruction source code segment that instructs the intelligent peripheral to forward a message to the customer requesting that the customer provide the subscriber number.

In another aspect of the present invention, a computer readable medium is provided for storing a computer program that obtains subscriber identification using a subscriber number input by a customer calling a subscriber identification information service. The computer readable medium includes an element instructing source code segment that causes a network element to request that a customer provide the subscriber number when the call is received from a switch in response to the switch receiving a shortened telephone number provided by the customer. The computer readable medium also includes an information requesting source code segment that forwards a query to a memory apparatus when the network element receives the subscriber number from the customer. The computer readable medium further includes an information transmitting source code segment that causes the subscriber identification to be forwarded to the customer when subscriber identification information corresponding to the subscriber number is available at the memory apparatus for the customer. When the subscriber identification information is unlisted, the information transmitting source code segment causes a message to be forwarded indicating that the subscriber number is unlisted.

In still another aspect of the present invention, the computer readable medium includes an authorization source code segment that determines whether the customer is authorized to receive subscriber identification information corresponding to an unlisted subscriber number.

A telecommunications system is provided for routing telephone calls to a system component of a telecommunications service provider's network in response to a customer's attempt to ascertain information related to an unrecognized number. The telecommunications system includes an advanced intelligent network (AIN) in which service logic is provided at service control points (SCPs) that receive queries from service switching points (SSPs).

A service switching point is connected to an individual communications device, such as a phone, fax or modem, and responds to particular dialing patterns or sequences. The service switching point triggers when it detects a predetermined dialing pattern and sends a query to the service control point. The query to a service control point results in an instruction to forward the call from the service switching point to an intelligent peripheral. The intelligent peripheral may include interactive voice response functionality that instructs the customer to input data by punching a keypad of the customer's phone. The intelligent peripheral may also include a text-to-speech processor that converts text data to audible signals that can be presented to the customer.

When the intelligent peripheral receives data from the customer, the intelligent peripheral performs a database lookup based on the received data. In response to the query to the database, the intelligent peripheral is either notified that information corresponding to the data is unavailable, or the intelligent peripheral receives a signal with the information corresponding to the data. The intelligent peripheral then plays an audible message to the customer. For example, when the data corresponds to an unlisted number the intelligent peripheral returns a pre-recorded message to the customer informing the customer that the number is unlisted. The message may also instruct the customer to hang up, or include a statement such as "Thank you for calling".

If the data corresponds to a listed number, the intelligent peripheral will convert the retrieved information associated with the listed number into a voice message, and forward the message to the customer via the service switching point. The message may include information corresponding to the listed number, such as a name and address of a subscriber associated with the listed number.

Additionally, data may be stored among multiple databases and apportioned among the databases according to any criteria desired by a telecommunications service provider. For example, separate databases may be provided for listed and unlisted numbers, land-based phone lines and wireless phones, different geographic areas, or different telecommunications service providers. Additional databases can be used to increase storage space, decrease processing requirements, or enhance privacy.

Interactive voice response units typically interact with a customer by receiving standard dual tone multi-frequency (DTMF) signals from the customer's communication device and providing audible instructions and other messages to the customer. In the alternative, an intelligent peripheral may be provided with speech recognition functionality, such as Nuance speech recognition software, available from Nuance Communications of Menlo Park, Calif., in addition to interactive voice response functionality. The speech recognition software may receive and interpret voice input from the customer. Accordingly, an intelligent peripheral may receive and interpret voice input from the customer and/or touch tone DTMF signals, as long as the intelligent peripheral has an interactive voice response capability and speech recognition software. Of course, any comparable speech recognition system may likewise be incorporated into the system.

The speech recognition functionality captures analog voice signals of the customer and converts the voice signals to digital data which may be stored in relation to the customer's call. The data is segmented, or arranged into recognizable patterns, and compared to previously stored models of words to be recognized. Furthermore, speech recognition functionality may include multiple languages, such as English, Spanish and Polish.

In an embodiment, Nuance Verifier 3.0 software may be incorporated into the intelligent peripheral to further enable verification based on the customer's voice print, enabling efficient authentication, in addition to conventional speech interaction. Speech verification software is used to verify a customer's identity before providing the customer access to sensitive information, such as information associated with an unlisted number.

As is explained herein, an intelligent peripheral may communicate with components of the public switched telephone network (PSTN). The intelligent peripheral may internally translate data messages received from the service control point through the SR-3511 protocol, the use of which enables simultaneous compatibility with interactive voice response functionality. Details of the SR-3511 protocol are provided in Telcordia, Recommendations SR-3511 SCP Intelligent Peripheral (IP) Interface Specification for TCP/IP, Version 5.0 (January 1997), the disclosure of which is expressly incorporated by reference herein in its entirety. In an embodiment, the translation program is coded in either C, C++ or JAVA.

FIG. 1 shows an exemplary service architecture of the telecommunications system of the present invention. As shown, a customer using a communication device 101, goes off hook and dials a shortened number, such as *99, to inquire for information associated with an unrecognized number. The telecommunications device is connected to a service switching point 110 that responds to particular dialing patterns or sequences by generating a query. By way of example, the service switching point may be a 1 AESS switch or 5ESS manufactured by Lucent Technologies, Inc.; DMS-100 switches manufactured by Nortel Networks Corporation (Nortel); AXE-10 switches manufactured by Telefonaktiebolaget LM Ericsson, or EWSD switches available from Siemens Information and Communication Networks, Inc. The switches may utilize AIN protocol. However, embodiments of the present invention may include switches, such as ATM switches, that are incorporated into any alternative telecommunications technology.

According to the present invention, each service switching point 110 is set with an originating trigger that responds to a shortened number, such as *99. Exemplary triggers include the Public Office Dialing Plan (PODP) feature code trigger, which is used with the Ericcson AXE-10, the Nortel DMS-100, the Siemens EWSD, the Lucent Technologies 5ESS and the Lucent Technologies 1AESS service switching point. In response to the trigger, the service switching point suspends the call and launches a Info Analyzed query to the service control point 130 through signaling transfer points (not shown).

The service switching point 110 and the service control point 130 communicate with each other using a standard interface protocol. In an embodiment, the interface protocol used by the service switching point 110 and the service control point 130 to communicate is AIN protocol.

In response to receiving the query from the service switching point 110, the service control point 130 processes the query and transfers control to common service logic, which determines a routing solution for the call. Exemplary service control points 130 include the Telcordia Integrated Service Control Point Current Generation Platform (ISCP) (CGP); the ISCP Next Generation Platform (NGP); the Lucent Advantage Service Control Point (LSCP) and Service Package Application (SPA); or the Telcordia Integrated Service Control Point (ISCP), loaded with ISCP software, available from Telcordia, Murray Hill, N.J.

The call flow logic of the present invention may be upgraded to accommodate future AIN releases and protocols and future trigger types. Specifications of AIN SSPs may be found in Telcordia GR-1299-CORE, Switch-Service Control Point Application Protocol Interface Generic Requirements, and Telcordia Technical Reference GR-1298-CORE, AIN Switching Systems Generic Requirements, the disclosures of which are expressly incorporated by reference herein in their entireties.

In response to the query, the service control point 130 executes its internal Called Number Identifier service logic and signals back to the inquiring service switching point 110 a Forward Call response with the destination routing number corresponding to the intelligent peripheral 140. Exemplary intelligent peripherals include a service node/intelligent peripheral, such as an IBM Resource Manager, a Lucent Compact Service Node or a Lucent Enhanced Media Resource Server (eMRS).

The service switching point forwards the call to the intelligent peripheral 140 through the switching network. The service control point 130 also instructs the intelligent peripheral 140 to play an introductory message to the customer. The introductory message may include a request for the customer to input the digits of the unrecognized number.

The customer responds by providing the digits of the unrecognized number by, for example, entering the digits using the keypad. When the digits are entered into the keypad, DTMF tones are generated corresponding to each digit of the unrecognized number.

The intelligent peripheral 140 receives the numbers and translates DTMF tones of the entered numerals of the unrecognized number into data. A data message with the numbers is forwarded to the service control point 130, which determines the appropriate database for the service using the NPA or NPA-NXX of the numerals. The service control point 130 forwards the data to the database 150 in order to determines whether the unrecognized number is listed and, if the unrecognized number is listed, to retrieve data corresponding to the unrecognized number.

The database 150 may be any database that associates a number with information such as a name and address of a subscriber. In an embodiment, the database 150 is a caller-ID with name (CNAM) database. In other embodiments, the database 150 may be a Public Safety database of the type used by emergency call centers, or a Line Information Database (LIDB). The database 150 may store full textual representations of a subscriber name and address or, in the alternative, abbreviations so that data may be efficiently stored. As indicated herein, data corresponding to subscribers of multiple telecommunications service providers may be divided among many databases dispersed in the advanced intelligent network by any criteria, such as listed/unlisted, different telecommunications service providers, and geography.

The database 150 forwards a message to the service control point 130 with the listed/unlisted status of the unrecognized number, as well as the data corresponding to the unrecognized number if the unrecognized number is listed. The service control point 130 forwards the data to the intelligent peripheral 140. The service control point 130 may instruct the intelligent peripheral 140 to process the data by, for example, using the text-to-speech processor to generate an audible signal that is played to the customer. Accordingly, the customer receives an audible message from the intelligent peripheral 140 with information associated with the previously unrecognized number. If the unrecognized number is not listed, the intelligent peripheral 140 plays a pre-recorded message that the unrecognized number is not listed.

The intelligent peripheral 140 may then provide the customer with additional prerecorded options, such as replaying the information corresponding to the unrecognized number, or entering another unrecognized number. Of course, if the customer hangs up or does not respond to a request after the options are played for a predetermined response period, the call is ended. In the embodiment of FIG. 1, after obtaining information associated with an unrecognized number, the unrecognized number information service will not provide an option for forwarding the call to a subscriber associated with the unrecognized number. Thus, the intelligent peripheral 140 is the ultimate destination of the call.

Figure 1A:
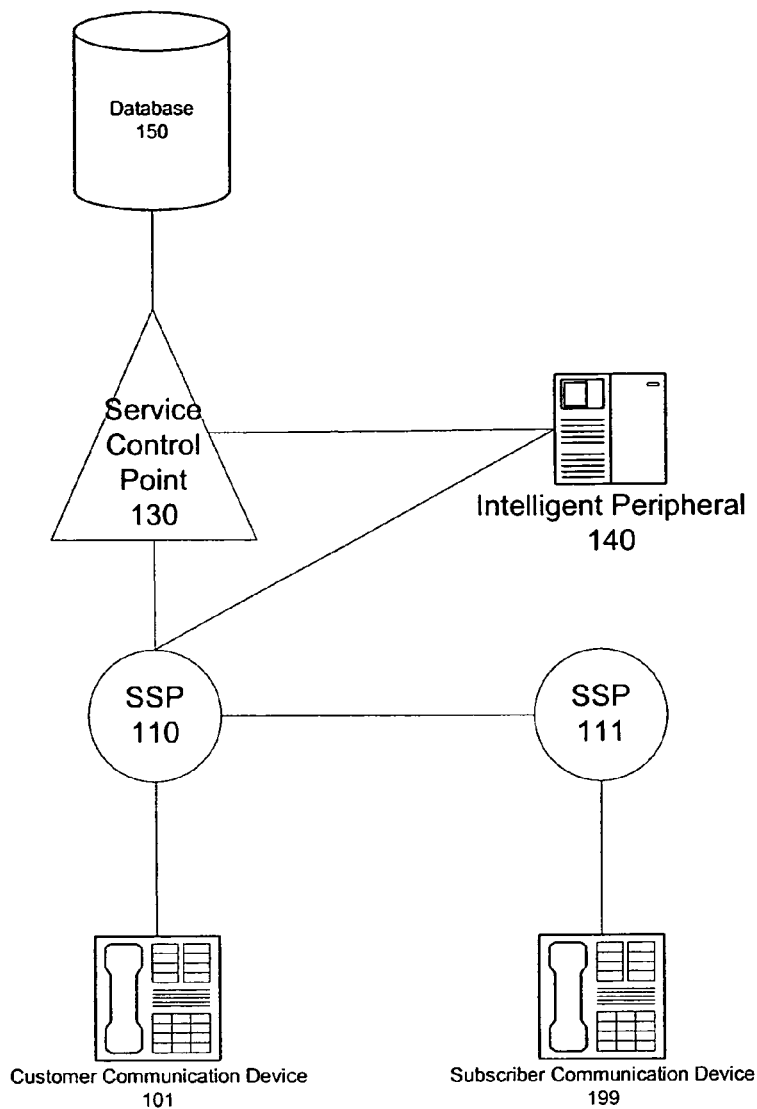
FIG. 1a shows an improved exemplary telecommunications network architecture for the unrecognized number identifier service of FIG. 1, according to an aspect of the present invention.

In another embodiment shown in FIG. 1*a*, the network includes a destination communications device 199 connected to a switch 111. Accordingly, when the intelligent peripheral 140 provides options to the customer, the options may include attempting a connection with the destination associated with the previously unrecognized number.

Of course, in the embodiments of FIGS. 1 and 1*a*, call service instructions are associated directly with the service control point 130. When call service instructions are stored at or otherwise directly associated with the service control point 130, the intelligent peripheral 140 of FIGS. 1 and 1*a* may retrieve the service information from the service control point 130 using the SR-3511 protocol. In another embodiment, the intelligent peripheral 140 may retrieve data from an external database, such as a Name and Address Database (not shown) through a generic data interface (GDI) server (not shown), for example, invoked by a GetData command.

If the customer chooses to call the unrecognized number (which, by now, is of course recognized), the intelligent peripheral 140 receives the customer's decision to call the unrecognized number. The intelligent peripheral 140 places a call to the communications device 199 through the service switching point 110. The service switching point 110 connects the original call with the newly initiated call using, for example, the two B channel transfer (TBCT) methodology. Alternatively, Release-to-Pivot capability can be used to re-route the call from the service switching point 110 to the communications device 199.

Figure 2:
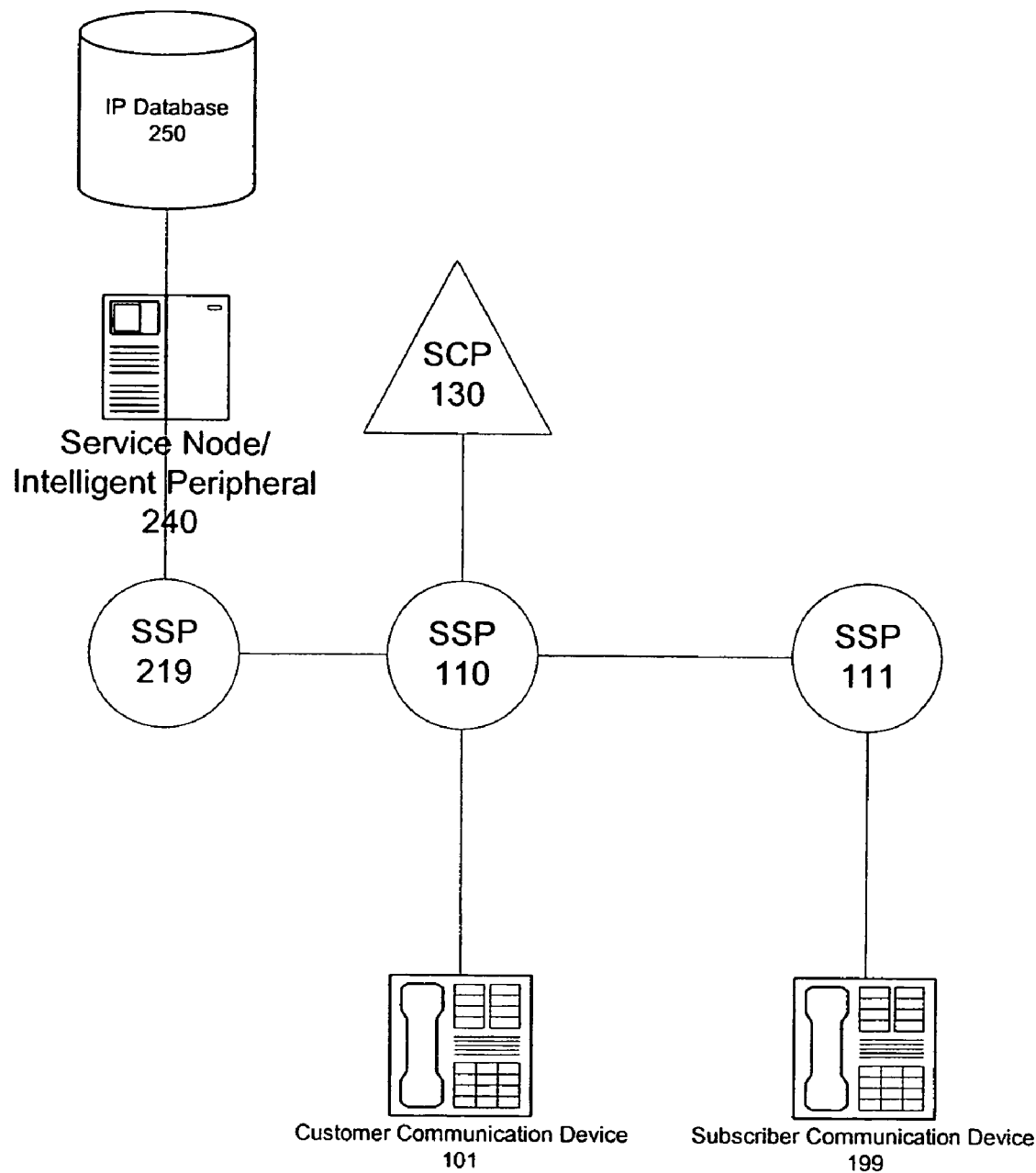
FIG. 2 shows another exemplary telecommunications network architecture for the unrecognized number identifier service, according to an aspect of the present invention.

FIG. 2 shows another exemplary service architecture of the telecommunications system of the present invention. As shown, a customer using a communications device 101, goes off hook and dials the shortened universal number to reach the unrecognized number identification service to inquire for information associated with an unrecognized number. The service switching point 110 suspends the call and forwards a query to the service control point 130. The service control point 130 determines the call is for the unrecognized number identification service and sends a Forward_Call response to the service switching point 110. The service switching point 110 will establish a connection with the service node/intelligent peripheral (SN/IP) 240 to obtain information from the customer.

The service node/intelligent peripheral 240 may differ from the intelligent peripheral 140 in the embodiment shown in FIG. 1 by a capability to operate independently of the service control point 130 in many aspects. The SN/IP 240 can be a computer or communications server linked to the service switching point 219 via, for example, an ISDN link using either ISDN-BRI (Basic Rate Interface) or an ISDN-PRI (Primary Rate Interface) protocol, each of which is known in the art. The service node/intelligent peripheral 240 of FIG. 2 may include interactive voice response functionality, similar to the intelligent peripheral 140 in FIG. 1.

The SN/IP 240 contains resources to offer service enhancements to customers of a telecommunications service provider. The SN/IP 240 may combine computer telephony integration (CTI) and advanced speech technologies in a single platform used as a system resource. The SN/IP 240 may provide speech recognition, text-to-speech/speech-to-text conversion and dual-tone multi-frequency (DTMF) recognition with external telephony resources. An example of text-to-speech processing using a pre-processor in a service node/intelligent peripheral (SN/IP) is disclosed in U.S. Pat. No. 6,400,809, issued Jun. 4, 2002, to BOSSEMEYER, Jr., et al., the disclosure of which is expressly incorporated herein by reference in its entirety.

The service node/intelligent peripheral 240 is connected to the service switching point 219, similar to the manner in which intelligent peripheral 140 is connected to service switching point 110 in FIG. 1. However, as noted above, once the call is received at the service node/intelligent peripheral 240, the service node/intelligent peripheral 240 is less dependent on the service control point 130 than was the intelligent peripheral 140 of FIG. 1. In particular, the service node/intelligent peripheral 240 performs processing functions and determines actions to take, such as playing a prerecorded message to a customer, without direction from the service control point 130.

According to the embodiment of FIG. 2, a database 250 of unrecognized numbers may be accessed directly by the service node/intelligent peripheral 240. Accordingly, the service node/intelligent peripheral 240 may search the database 250 by, for example, forwarding a signal to search the database 250, rather than relaying data signals through the service control point 130 as in FIG. 1.

In the embodiment of FIG. 2, the service switching point 110 may be instructed to connect with the service node/intelligent peripheral 240 temporarily to enable, for example, speech recognition functionality or other security protocols of the service node/intelligent peripheral 240. The connection between a service switching point 110 and the service node/intelligent peripheral 240 is established using, e.g., BRI or PRI.

After the service switching point 110 establishes the connection with the service node/intelligent peripheral 240 and the customer provides the unrecognized number, the service node/intelligent peripheral 240 ascertains the information associated with the unrecognized number. A voice connection may be established with the service node/intelligent peripheral 240, through a second service switching point 219 (if necessary) based on signaling instructions sent via a signaling system 7 (SS7) or comparable out-of-band signaling system. As a result, the connection between the service switching point 219 and the service node/intelligent peripheral 240 enables the service node/intelligent peripheral 240 to perform the speech prompting and DTMF signal collection and translation as noted above, for example, to obtain the unrecognized number for which the customer wishes to obtain associated information. When the unrecognized number is determined from the database 250, and the customer chooses to be connected to the communications device 199, the SN/IP 240 will initiate a call to communications device 199. The new call and the original call may be connected using, for example, the two B channel transfer methodology.

Figure 3:
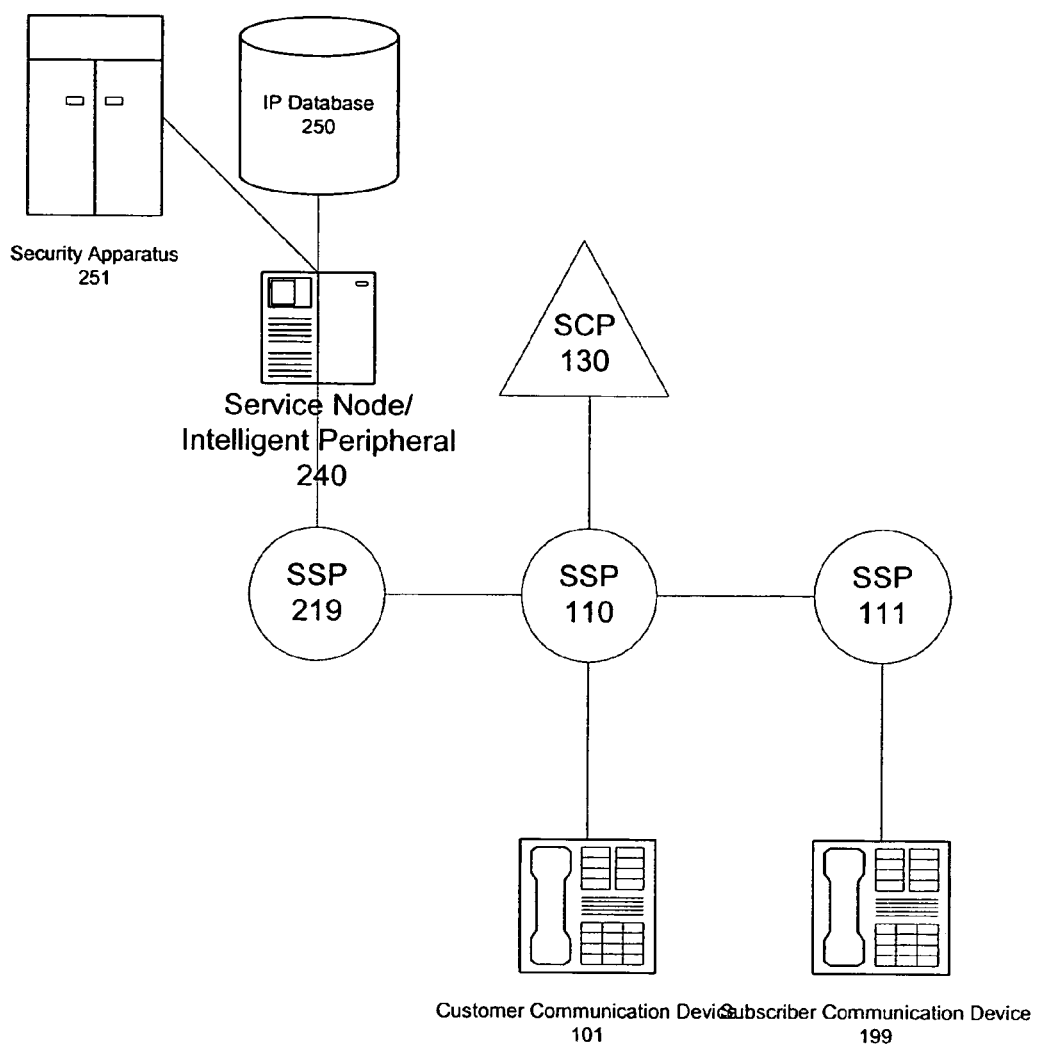
FIG. 3 shows an improved exemplary telecommunications network architecture for the unrecognized number identifier service of FIG. 1, according to an aspect of the present invention.

In the embodiment of FIG. 3, the service node/intelligent peripheral 240 includes a security apparatus 251 in order to pre-qualify a customer for a particular aspect of the called number identifier service, such as an unlisted unrecognized number look-up. In the alternative, a shortened dialing pattern may be dedicated to an unrecognized/unlisted number information service for pre-qualified users to look-up unrecognized numbers. When a shortened dialing pattern is dedicated to the unlisted number information service, every call made using the shortened dialing pattern will be subject to the security protocols. Therefore, with a shortened dialing pattern dedicated to an unlisted number information service, a pre-authorized user can access unlisted numbers.

To process the security protocols, the service control point 130 is notified that the customer will attempt to obtain information associated with an unlisted unrecognized number. The service switching point 219 will establish a connection with the service node/intelligent peripheral 240 to obtain, for example, a voice print comparison or special passcode that is used to determine that the customer is authorized to access an unlisted unrecognized number database. The service node/ intelligent peripheral 240 compares information obtained from the customer with information of the security apparatus 251, to ascertain whether the customer has entered valid information to obtain information associated with an unrecognized unlisted number.

As in the embodiment of FIG. 2, a voice connection may be established with the service node/intelligent peripheral 240, through a second service switching point 219 (if necessary). As a result, the connection between the service switching point 219 and the service node/intelligent peripheral 240 enables the service node/intelligent peripheral 240 to perform, for example, a speech prompting and recognition function. The speech recognition function is performed, for example, to obtain a voice print of the customer and compare the voice print to voice prints of authorized users stored in the security apparatus 251.

When the security protocols of the security apparatus 251 are satisfied such that a customer is authorized to access information associated with an unrecognized number, the service node/intelligent peripheral 240 will interact with the customer, similar to a call in FIGS. 1, 1a and 2. In any case, the call is processed by the service node/intelligent peripheral 240 to ascertain information associated with an unrecognized number.

In the embodiment of FIG. 3, where security/authorization protocols are used, when the initial call is forwarded to the service node/intelligent peripheral 240, the customer may interact with the service node/intelligent peripheral 240 until the service node/intelligent peripheral 240 receives the unrecognized number. The service node/intelligent peripheral 240 then determines the information associated with the unrecognized number from the database 250.

Furthermore, when the service node/intelligent peripheral 240 receives the information associated with the unlisted unrecognized number from the database, the service node/ intelligent peripheral 240 performs text to speech conversion and provides the information to the customer. The service node/intelligent peripheral 240 may also play a pre-recorded message to the customer offering the customer the opportunity to input another unrecognized number. In the alternative, the service node/intelligent peripheral 240 may offer the customer the opportunity to attempt a connection with communications device 199 if information associated with the unrecognized number is determined.

In any of the embodiments shown above, additional features may be provided that enhance the unrecognized number identifier. For example, in any of the embodiments associated with FIGS. 1, 1a, 2 and 3, if the unrecognized number is not listed, the customer may be presented with an option to enter a special passcode used by public safety officials or other officials authorized by law to access information corresponding to unlisted unrecognized numbers. In other words, the intelligent peripheral 140 or service node/intelligent peripheral 240 of any of the embodiments can be modified to allow an authorized official to obtain information associated with an unrecognized unlisted number after the intelligent peripheral 140 or service node/intelligent peripheral 240 determines that the number is unlisted.

For example, if a special passcode is entered by the customer, the intelligent peripheral 140 will again be directed by the service control point 130 to forward a message to the database 150. The new message contains an unlisted access authorization to obtain the information associated with the unlisted unrecognized number. Alternatively, the new message may be forwarded to another database (not shown) dedicated to unlisted numbers and the information will be returned in the same manner described above for a listed unrecognized number.

In another embodiment, information related to the inquiry may be compiled at the intelligent peripheral 140, such as the special passcode, the date and time of the inquiry, a voice print requested by the intelligent peripheral 140 or service node/ intelligent peripheral 240, the unrecognized number, and/or the information associated with the unrecognized number. As a result, information for each query of the unrecognized number identifier service may be stored at a database (not shown) in order to later associate each call to the service with the customer making the call.

Additionally, the customer communications device 101 may be checked to ensure that an indicator associated with the calling party's device is of a type that indicates the calling party's device is allowed to inquire about unrecognized numbers, whether the inquiry is for unlisted or listed numbers. For instance, the service may not be available for pay phones, centrex lines, or any other lines designated as not suitable for use with the dissemination of information associated with unrecognized numbers.

Figure 4:
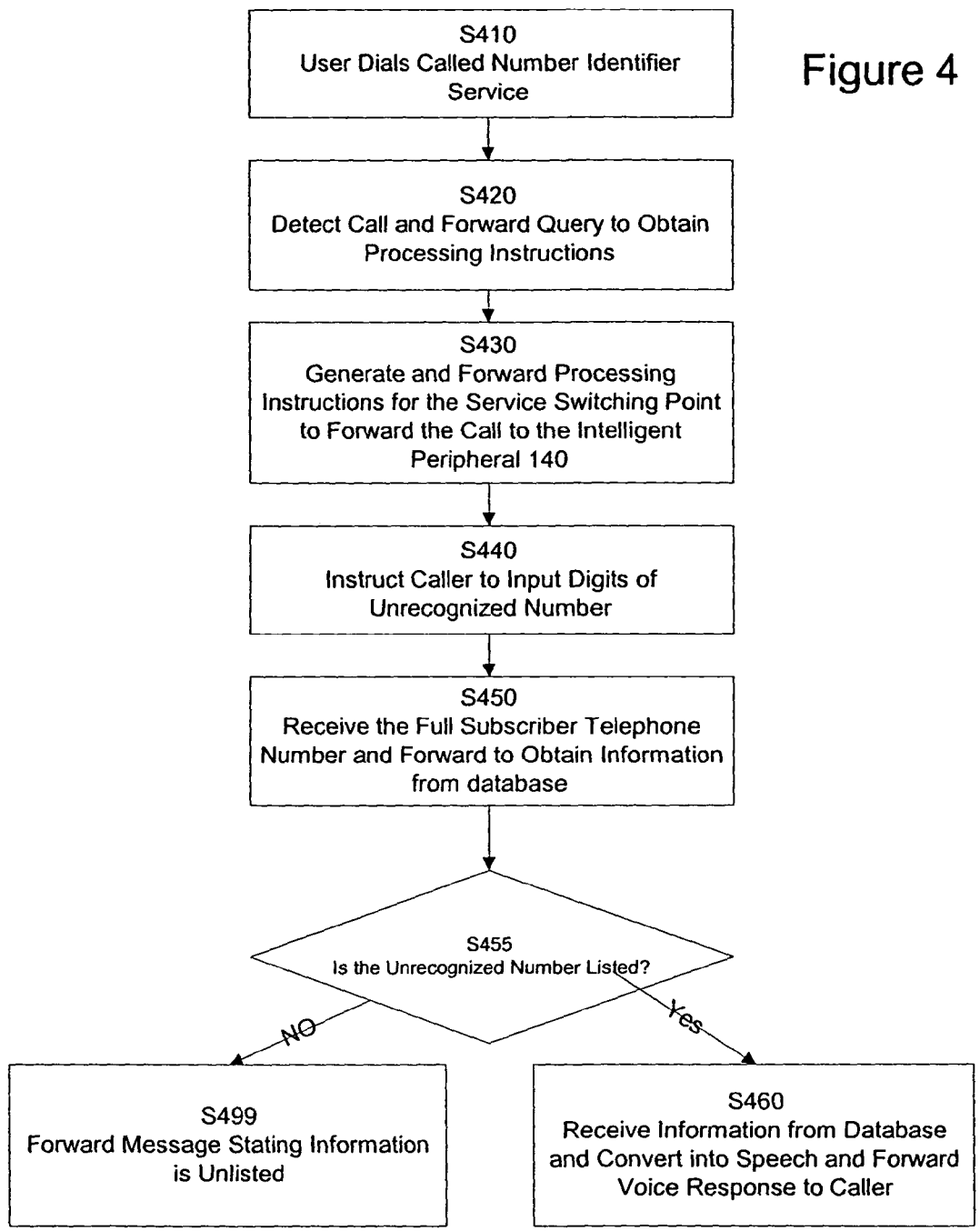
FIG. 4 is a flow diagram showing a method for using the unrecognized number identifier service, according to an aspect of the present invention.

FIG. 4 shows an exemplary flow diagram for using the service architecture shown in FIG. 1. The call starts when a customer goes off-hook and dials a shortened dialing pattern at S410. At S420, the shortened dialing pattern is received at the service switching point 110 where a query is initiated to obtain processing instructions from the service control point 130. At S430, the service control point 130 receives the query and determines routing instructions for the call based on the query. The routing instructions are forwarded to the service switching point 110 and the service switching point 110 forwards the call to the intelligent peripheral 140.

At S440, when the call is connected to the intelligent peripheral 140, the intelligent peripheral 140 executes a routine that results in a pre-recorded or digitally generated voice message being played to the customer asking the customer to enter the full unrecognized number. The customer may be given the option to enter the digits using the keypad. The intelligent peripheral 140 then collects the digits and translates the collected digits into a message that is sent to a database 150 as a query at S450.

The database 150 will conduct a query with the unrecognized number. A determination whether the unrecognized number is listed is made at S455. If the unrecognized number is listed at S455 (S455=Yes), the database 150 will compile the information into a signal that is sent to the intelligent peripheral 140. If the database 150 finds information associated with the unrecognized number, the intelligent peripheral 140 translates the signal into an audible signal and plays it to the customer at S460. However, if the unrecognized number is unlisted at S455 (S455=No), the intelligent peripheral 140 plays a pre-recorded or digital message to the customer informing the customer that the unrecognized number is unlisted at S499.

The flow diagram in FIG. 4 would apply to the service architecture shown in FIGS. 2 and 3 in a similar manner to that described above for the service architecture in FIG. 1. However, the service node/intelligent peripheral 240 of FIG. 2 replaces the intelligent peripheral 140 of FIG. 1, and the information associated with the unrecognized number is obtained by the service node/intelligent peripheral 240 from the database 250 in FIG. 2 (e.g., without relaying the subscriber information through service control point 130).

Figure 5:
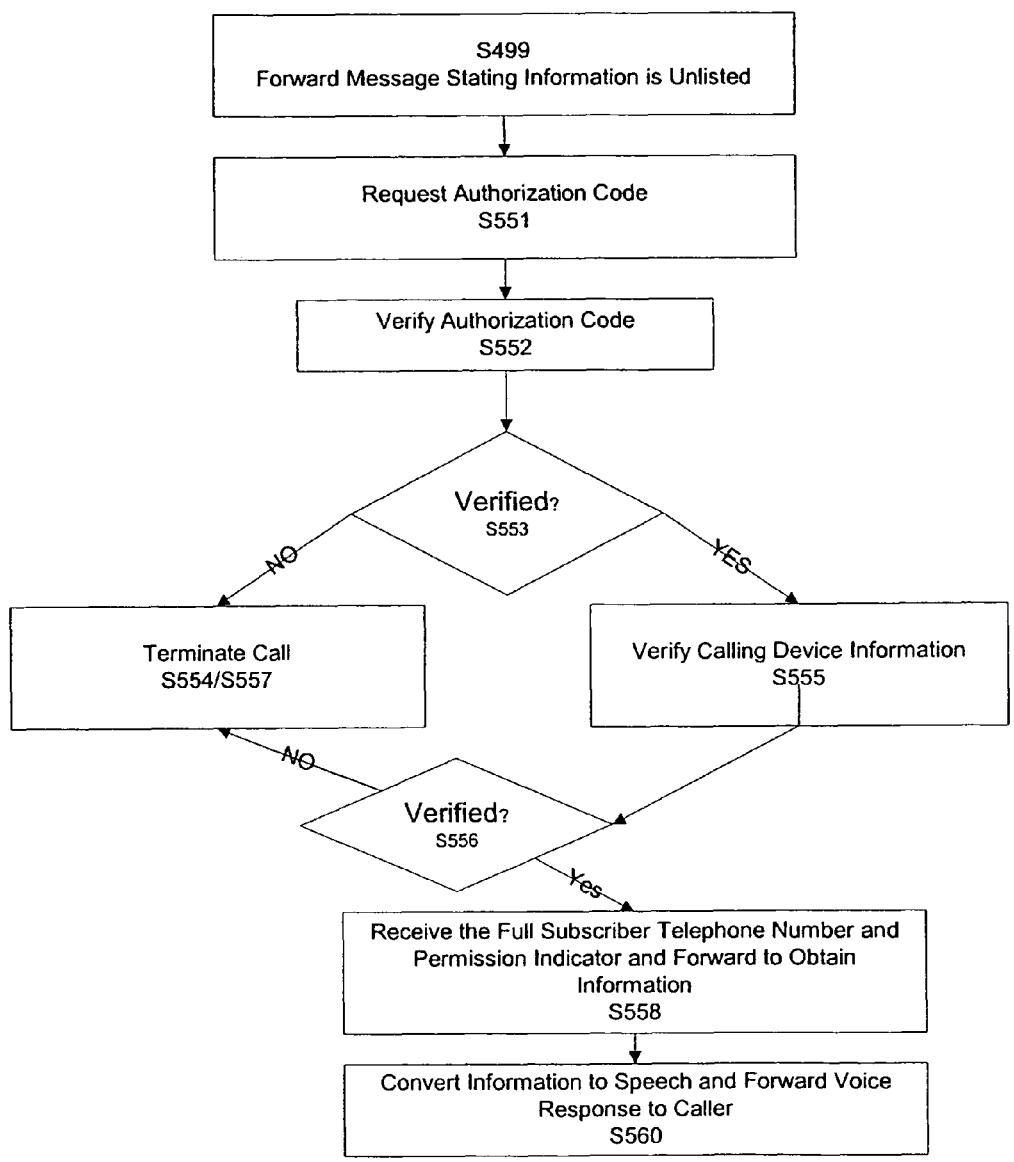
FIG. 5 is a flow diagram showing exemplary service logic, according to an aspect of the present invention.

FIG. 5 shows an exemplary flow diagram for an authorized customer to access information associated with an unrecognized unlisted number in a database. The flow of FIG. 5 is invoked after the full unrecognized number is forwarded to the database from the intelligent peripheral 140 and the unrecognized number is determined to be unlisted at S455. As shown in FIG. 4, at S499, the interactive voice response functionality of the intelligent peripheral 140 plays a pre-recorded or digital message to the customer informing the customer that the unrecognized number is unlisted. In addition to the message informing the customer that the unrecognized number is unlisted, a message is played to the customer requesting an authorization code at S551. In particular, the intelligent peripheral 140 prompts the customer to enter an authorization code via a keypad or audibly. The customer's authorization code is verified at S552/S553. If the customer enters a valid authorization code, the intelligent peripheral 140 may cause a message to be sent to the service control point 130 to determine information related to the calling device 101 used by the customer at S555/S556.

For example, the service control point 130 may check the Calling_Party ID and compare the Calling_Party ID against a table associated with the service control point 130 to determine whether the customer is using a device that is authorized to obtain information related to unlisted numbers at S555. In the alternative, the service control point 130 may merely inquire to ensure that a particular type of phone (e.g., pay phone) is not being used to make the inquiry.

If the customer provides a proper authorization code at S552 and the phone is verified as a device authorized to receive information associated with unlisted numbers at S555, the intelligent peripheral 140 forwards a permission indicator or override code and the full unrecognized number is again sent to the database 150 at S558. The intelligent peripheral 140 receives the information from the database 150, converts the information to speech and forwards a voice response with the information to the customer at S560. However, if the calling device information is not verified at S556 or the authorization code is not verified at S553, the call is terminated at S557 or S554, respectively. Additionally, the call may be terminated at S554 after a set period of time if an authorization code is not provided. A brief message may be played to the customer at S554 or S557 informing the customer that the call is ending.

Of course, the order of steps of the authorization procedure of FIG. 5 may vary. For instance, the check to verify the calling device information at S555 may occur before, or simultaneous with, the request for the authorization code and the verification of the authorization code at S552. Additionally, other security procedures are known and may be used in place of the procedures at S551 to S557. For instance, a voice print may be taken from the customer and matched against a memory of authorized users.

Figure 6:
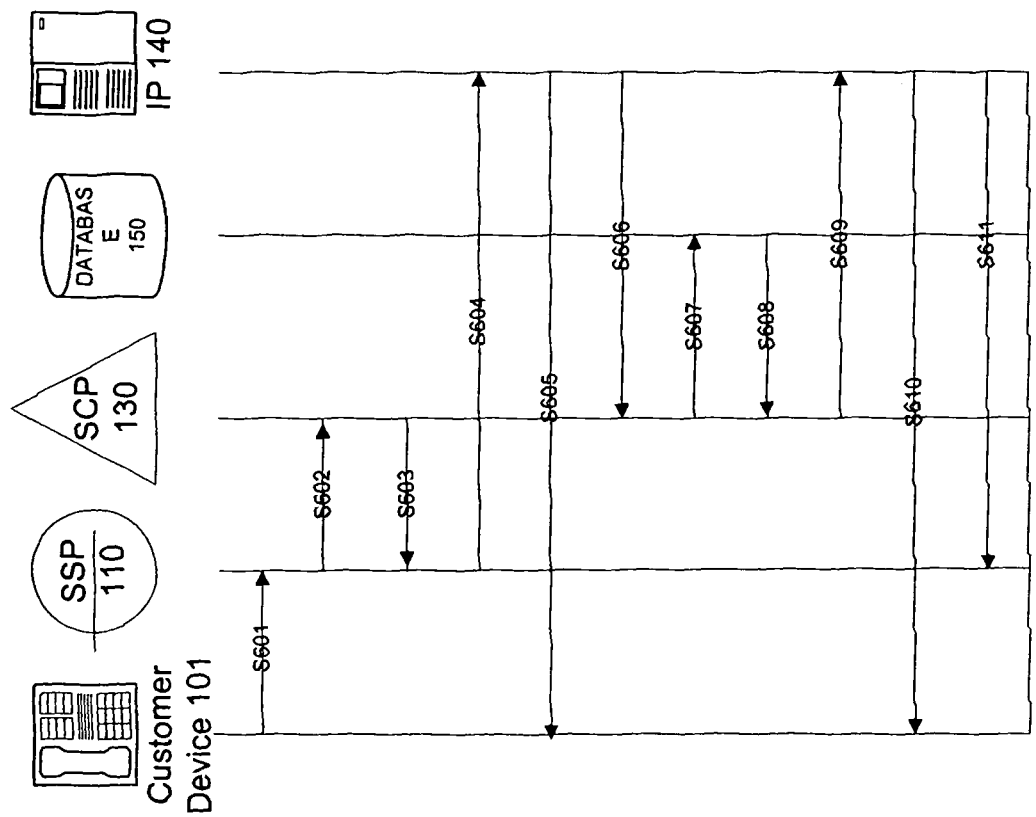
FIG. 6 is an exemplary call flow diagram showing the various steps for completing a call using the unrecognized number identifier service.

FIG. 6 shows an exemplary call flow corresponding to the telecommunications network architecture of FIG. 1. Initially, a customer connected to a service switching point 110 dials the shortened dialing pattern in S601 by, for example, removing a phone handset from a cradle and entering the shortened dialing pattern on a keypad. The service switching point 110 connected to the user's handset detects the shortened dialing pattern and launches a query to the service control point 130 in S602. The service control point 130 executes the called number identifier service logic and instructs the service switching point 110 to forward the call to the intelligent peripheral 140 at S603. The service switching point 110 forwards the call to the intelligent peripheral 140 at S604. The intelligent peripheral 140 receives the call and begins communicating with the customer at step S605. In particular, the communications between the intelligent peripheral 140 and the customer at step S605 includes an instruction to the customer to enter the digits of the unrecognized number. Furthermore, S605 includes the customer actually providing the digits of the unrecognized number on a keypad.

The intelligent peripheral 140 gathers the digits of the unrecognized number and forwards a query to the service control point 130 at step S606 including the gathered digits. The service control point 130 forwards the gathered digits to the database 150 at S607. The database 150 determines whether the unrecognized number is listed or unlisted and, if the unrecognized number is listed, determines the information associated with the unrecognized listed number. The status of the unrecognized number, and the information associated with the unrecognized number if listed, is forwarded in a message to the service control point 130 at S608. The service control point 130 forwards the data in a message to the intelligent peripheral 140 at S609.

The intelligent peripheral 140 initiates another interactive communications session with the user at S610 where the user is informed whether the number is listed or unlisted (available or unavailable). If the number is listed (available), the information associated with the listed number is translated into an audible message and presented to the user/customer. The intelligent peripheral 140 may also ask the customer if the customer wishes to inquire for information associated with a second unrecognized number, or terminate the call. When the call is to be terminated, at S611 the intelligent peripheral 140 initiates a process to tear down the call.

Thus, according to the exemplary call-flow of FIG. 6, corresponding to the embodiment of FIG. 1, a customer receives information corresponding to an unrecognized number by dialing the shortened dialing pattern which is recognized by the service switching point 110, and inputting the unrecognized number in response to a prompt from the intelligent peripheral 140. As should be clear, many enhancements may be made to the architecture of FIG. 1 to, for example, set up the session with the intelligent peripheral as a second call, or invoke security protocols if the unrecognized number is unlisted.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the database shown in FIG. 1 could be accessed through the service control point 130 to enable efficient signaling. Moreover, additional databases may be provided to separate information corresponding to listed numbers from information corresponding to unlisted numbers. Additionally, a separate database may be accessed through the intelligent peripheral 140 or elsewhere to store information relating to each inquiry, including, for example, the number of times a particular customer calls the service, each unrecognized number input by the customer, whether information associated with the unrecognized number was returned to the customer, etc. Moreover, a blocking table could be provided in FIG. 1 to determine whether a particular type of calling device (e.g., pay phone) is being used to make the inquiry.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for internet and other packet switched network transmissions (e.g., SR-3511 GR-1129, SS7, TCP/IP) represent examples of the state of the art. Such standards are periodically superseded by faster or more efficient equivalents having essentially the same functions. Accordingly, replacement standards and protocols having the same functions are considered equivalents.

What is claimed is:

1. A method of obtaining communication address identification information corresponding to a communication address number, the method comprising:
   collecting the communication address number from a user at a telecommunications apparatus in response to a trigger being initiated at a switch and a connection being established between the switch and the telecommunications apparatus in response to a communication address inquiry number entered by the user;
   obtaining communication address identification information from a communication address identifier based on the communication address number collected from the user; and
   sending the communication address identification information to the user when communication address identification information corresponding to the communication address number is available.

2. The method of obtaining communication address identification information of claim 1, further comprising:
   sending a message from the telecommunications apparatus to the user indicating that the communication address number is unavailable when communication address identification information corresponding to the communication address number is unavailable.

3. The method of obtaining communication address identification information of claim 1, wherein the communication address identification information is received from the communication address identifier as a data signal at the telecommunications apparatus and translated into an audible signal for presentation to the user.

4. The method of obtaining communication address identification information of claim 1, further comprising:
   forwarding to the user an audible prompt to provide the communication address number.

5. The method of obtaining communication address identification information of claim 1, further comprising:
   determining whether the user is authorized to receive communication address identification information corresponding to an unlisted communication address number.

6. The method of obtaining communication address identification information of claim 5, the determining further comprising:
   receiving a line indicator that indicates a type of line used by the user.

7. The method of obtaining communication address identification information of claim 5, the determining further comprising:
   receiving an authorization code from the user, the authorization code indicating that the user is authorized to receive communication address identification information that is not available to other users.

8. The method of obtaining communication address identification information of claim 4, further comprising:
   receiving an instruction to forward the audible prompt to the user to provide the communication address number.

9. The method of obtaining communication address identification information of claim 1, further comprising:
   forwarding an option message to the user, the option message including an option to provide a new communication address number.

10. The method of obtaining communication address identification information of claim 1, further comprising:
    forwarding an option message to the user, the option message including an option to terminate the call.

11. The method of obtaining communication address identification information of claim 1, further comprising:
    forwarding an option message to the user, the option message including an option to provide authorization information.

12. The method of obtaining communication address identification information of claim 1,
    wherein the communication address identification information is obtained in response to a query which is forwarded to the communication address identifier, and
    wherein the communication address identifier determines whether communication address identification information is available and provides a response to the query.

13. The method of obtaining communication address identification of claim 1,
    wherein the communication address identification information is obtained from a memory in response to a query which is forwarded to the memory via the communication address identifier, and
    wherein the communication address identifier receives a response from the memory and determines whether communication address identification information is available.

14. A telecommunications apparatus that obtains communication address identification information corresponding to a communication address, the telecommunications apparatus comprising:

a number collector that collects a communication address number from a user in response to a trigger being initiated at a switch and a connection being established between the switch and the telecommunications apparatus in response to a communication address inquiry number entered by the user;

an information obtainer that obtains communication address identification information from a communication address identifier based on the communication address number collected from the user; and an information output that sends the communication address identification information to the user when communication address identification information corresponding to the communication address number is available.

15. The telecommunications apparatus of claim 14, further comprising:

a text-to-speech processor that obtains the communication address identification information from the communication address identifier as a data signal and translates the communication address identification information into an audible signal.

16. A non-transitory computer readable medium for storing a computer program that obtains communication address identification corresponding to a communication address number, the computer readable medium comprising:

a communication address number collecting code segment that collects the communication address number from a user at a telecommunications apparatus in response to a trigger being initiated at a switch and a connection being established between the switch and the telecommunications apparatus in response to a communication address inquiry number entered by the user;

a communication address identification information obtaining code segment that obtains communication address identification information from a communication address identifier based on the communication address number collected from the user, and a communication address identification information sending code segment that sends the communication address identification information to the user when communication address identification information corresponding to the communication address number is available.

17. The non-transitory computer readable medium of claim 16, further comprising:

an instruction receiving code segment that receives an instruction to forward a message to the user requesting that the user provide the communication address number.

18. The non-transitory computer readable medium of claim 16, the communication address identification information obtaining code segment further comprising:

an information requesting code segment that forwards a query to the communication address identifier in response to the telecommunications apparatus receiving the communication address number from the user.

19. The non-transitory computer readable medium of claim 16, further comprising:

a tone-translating code segment that translates dual tone multi-frequency tones into data corresponding to the communication address number.

20. The non-transitory computer readable medium of claim 16, further comprising:

a user authenticating code segment that authenticates the user by prompting the user to provide authentication information.

21. The non-transitory computer readable medium of claim 20, wherein the authentication information comprises a voice print of the user.

22. The non-transitory computer readable medium of claim 20, wherein the authentication information comprises a predetermined passcode.

23. The method of obtaining communication address identification information of claim 1, wherein the communication address inquiry number comprises an abbreviated dialed number.

24. The method of obtaining communication address identification information of claim 23, wherein the abbreviated number comprises *99.

* * * * *